United States Patent
Bonal et al.

(10) Patent No.: US 7,941,506 B2
(45) Date of Patent: May 10, 2011

(54) USER INTERFACE FOR NETWORK DISCOVERY OPERATIONS

(75) Inventors: Olivier Bonal, Marseilles (FR); Sebastien Medard, Gardanne (FR)

(73) Assignee: BMC Software, Inc., Houston, TX (US)

( * ) Notice: Subject to any disclaimer, the term of this patent is extended or adjusted under 35 U.S.C. 154(b) by 1489 days.

(21) Appl. No.: 11/295,364

(22) Filed: Dec. 6, 2005

(65) Prior Publication Data

US 2006/0120306 A1 Jun. 8, 2006

Related U.S. Application Data

(60) Provisional application No. 60/633,639, filed on Dec. 6, 2004.

(51) Int. Cl.
*G06F 15/177* (2006.01)
(52) U.S. Cl. .................... 709/220; 715/735
(58) Field of Classification Search .............. 709/220; 715/735
See application file for complete search history.

(56) References Cited

U.S. PATENT DOCUMENTS

| 6,336,138 B1* | 1/2002 | Caswell et al. | 709/223 |
| 2005/0038889 A1* | 2/2005 | Frietsch | 709/224 |
| 2006/0123393 A1* | 6/2006 | Atkins et al. | 717/121 |
| 2006/0179124 A1* | 8/2006 | Stefaniak et al. | 709/219 |

* cited by examiner

*Primary Examiner* — John Follansbee
*Assistant Examiner* — Alan S Chou
(74) *Attorney, Agent, or Firm* — Wong, Cabello, Lutsch, Rutherford & Brucculeri, L.L.P.

(57) ABSTRACT

Methods, apparatus, systems and computer program products to capture discovery task information are described. More specifically, a graphical user interface is described that simplifies the task of defining what types of components (hardware and software), domains and methods are to be used during an IT infrastructure discovery operation. One benefit of using the described user interface is that the user is relieved of the burden of determining what aspects of the discovery action need be defined. Another benefit is that a user may be asked for input for only those elements necessary to the discovery—based on the user's prior input. For example, if the only type of component identified for discovery are JAVA® platforms, only those discovery methods (e.g., JMX) related to JAVA® platforms will be proffered to the user during that phase of specifying the discovery operation.

29 Claims, 12 Drawing Sheets

INTRODUCTORY WINDOW 300

| STEP 1 OF 6: INTRODUCTION 305 ||
|---|---|
| ROADMAP 310<br>☒ INTRODUCTION<br>☐ SPECIFY TYPE<br>☐ SPECIFY DOMAIN<br>☐ SPECIFY METHOD<br>☐ SPECIFY POST-<br>DISCOVERY ACTIONS<br>☐ SPECIFY SCHEDULE | CONTEXTUAL INFORMATION AND<br><br>USER INPUT REGION<br><br>315 |
|  | PREVIOUS  NEXT  SAVE  CANCEL  HELP |

FIG. 3A

CONTEXTUAL INFORMATION
AND USER INPUT REGION 315

| DISCOVERY SET NAME: _____ 320 _____ |
|---|
| LIST OF PRIOR DEFINED DISCOVERY SETS<br><br>325 |

FIG. 3B

TYPE WINDOW 400

| STEP 2 OF 6: TYPE SPECIFICATION 405 | |
|---|---|
| ROADMAP 410<br>■ INTRODUCTION<br>☒ SPECIFY TYPE<br>☐ SPECIFY DOMAIN<br>☐ SPECIFY METHOD<br>☐ SPECIFY POST-<br>DISCOVERY ACTIONS<br>☐ SPECIFY SCHEDULE | CONTEXTUAL INFORMATION AND<br><br>USER INPUT REGION<br><br>415 |
| | PREVIOUS  NEXT  SAVE  CANCEL  HELP |

FIG. 4A

CONTEXTUAL INFORMATION
AND USER INPUT REGION 415

| LIST OF AVAILABLE<br><br>DISCOVERY MECHANISMS<br><br>420 | DESCRIPTION<br><br>425 |
|---|---|

FIG. 4B

DOMAIN WINDOW 500

| STEP 3 OF 6: DOMAIN SPECIFICATION 505 ||
|---|---|
| ROADMAP 510<br>■ INTRODUCTION<br>■ SPECIFY TYPE<br>☒ SPECIFY DOMAIN<br>☐ SPECIFY METHOD<br>☐ SPECIFY POST-DISCOVERY ACTIONS<br>☐ SPECIFY SCHEDULE | CONTEXTUAL INFORMATION AND<br>USER INPUT REGION<br>515 |
| | PREVIOUS  NEXT  SAVE  CANCEL  HELP |

FIG. 5A

CONTEXTUAL INFORMATION
AND USER INPUT REGION 515

SELECTION TABS 520

| DOMAIN | SUBNET | HOST | RANGE |
|---|---|---|---|
| LIST OF<br>AVAILABLE DOMAINS<br>522 | 526 | | LIST OF<br>SELECTED DOMAINS<br>524 |
| INFORMATION ON SELECTED DOMAINS<br>528 ||||

FIG. 5B

METHOD WINDOW 600

| STEP 4 OF 6: METHOD SPECIFICATION  605 | |
|---|---|
| ROADMAP 610<br>■ INTRODUCTION<br>■ SPECIFY TYPE<br>■ SPECIFY DOMAIN<br>☒ SPECIFY METHOD<br>☐ SPECIFY POST-DISCOVERY ACTIONS<br>☐ SPECIFY SCHEDULE | CONTEXTUAL INFORMATION AND<br><br>USER INPUT REGION<br><br>615 |
| | PREVIOUS   NEXT   SAVE   CANCEL   HELP |

FIG. 6A

CONTEXTUAL INFORMATION
AND USER INPUT REGION 615

| LIST OF SELECTED<br><br>DISCOVERY TYPES<br><br>620 | LIST OF RELEVANT<br><br>DISCOVERY<br><br>METHODS<br><br>622 | INFORMATION<br><br>PANEL<br><br>624 |
|---|---|---|

FIG. 6B

METHOD WINDOW 600

```
STEP 4 OF 6: METHOD SPECIFICATION  605
```

| 620 | 622 | |
|---|---|---|
| ☒ TYPE-1 | ☒ METHOD-1 | |
| ☐ TYPE-2 | ☐ METHOD-2 | INFORMATION PANEL |
| . | . | 624 |
| . | . | |
| ☐ TYPE-N | ☒ METHOD-N | |

PREVIOUS  NEXT  SAVE  CANCEL  HELP

FIG. 6C

PARAMETER WINDOW 626

PARAMETERS FOR DISCOVERY METHOD: XXXXX  628

610

PARAMETER-1

PARAMETER-2

PARAMETER-3

.
.
.

PARAMETER-M

CONTEXTUAL INFORMATION AND

USER INPUT REGION

615

PREVIOUS  NEXT  SAVE  CANCEL  HELP

FIG. 6D

CREDENTIAL WINDOW 630

| CREDENTIALS FOR DISCOVERY METHOD: XXXXX 632 ||
|---|---|
| 610<br>CREDENTIAL-1<br><br>CREDENTIAL-2<br><br>CREDENTIAL-3<br>.<br>.<br>.<br>CREDENTIAL-M<br>.<br>.<br>. | CONTEXTUAL INFORMATION AND<br><br>USER INPUT REGION<br><br>615 |
| PREVIOUS   NEXT   SAVE   CANCEL   HELP ||

FIG. 6E

SCHEDULE WINDOW 800

| STEP 6 OF 6: SCHEDULE 805 ||
|---|---|
| ROADMAP 810<br>■ INTRODUCTION<br>■ SPECIFY TYPE<br>■ SPECIFY DOMAIN<br>■ SPECIFY METHOD<br>■ SPECIFY POST-<br>    DISCOVERY ACTIONS<br>☒ SPECIFY SCHEDULE | CONTEXTUAL INFORMATION AND<br><br>USER INPUT REGION<br><br>815 |
| PREVIOUS   NEXT   SAVE   CANCEL   HELP ||

FIG. 8

USER INTERFACE FOR NETWORK DISCOVERY OPERATIONS

CROSS-REFERENCE TO RELATED APPLICATIONS

This application claims priority to US provisional patent applications entitled "Topology Discovery" (Ser. No. 60/633,639), "Generic Discovery" (Ser. No. 60/633,625) and "Change Configuration Management" (Ser. No. 60/633,640), all filed on 6 Dec. 2004. This application also claims priority to US applications entitled "Resource Reconciliation" (Ser. No. 11/204,189), filed 15 Aug. 2005 and "Generic Discovery for Computer Networks" (Ser. No. 11/999,999), filed 6 Dec. 2005. All of these references are hereby incorporated by reference.

BACKGROUND

The invention relates generally to computer networks and, more particularly, to a graphical user interface associated with network discovery operations.

It will be recognized that the volume and rate at which hardware (e.g., computers, switches, routers and storage devices or systems) and software (e.g., user applications, application suites and environments such as order-entry and database management systems) are being deployed within business organizations is high and continues to grow. An essential aspect of managing this growth includes monitoring, controlling and documenting this deployment process to minimize potential outages, lower total operational costs, improve customer service and meet corporate compliance and security requirements. Knowledge of network topology or, more generally, information technology ("IT") infrastructure topology also permits one to understand how various components deliver business services to end users. This, in turn, can lead to improved management and greater efficiency in the use of such resources.

The task of identifying hardware and software components coupled to a network is often referred to as "discovery." It will be recognized that discovery can be a very complex operation—involving different types of hardware and software coupled via many different, and often unknown, network topologies. As used herein, the term "network" can mean a single network (local or wide area) or multiple separate networks coupled via any private (e.g., an intranet) or public (e.g., the Internet) network or any combination of private and public networks and using any suitable communications protocol and any media (e.g., wired or wireless). Illustrative communication protocols include, but are not limited to, Transport Control Protocol ("TCP"), Sequence Packet Exchange "SPX"), User Datagram Protocol ("UDP"), Internet Protocol versions 4 or 6 ("IP" and "IPv6") and Internet Control Message Protocol ("ICMP").

In prior art discovery systems a user, often a system administrator, configures a discovery operation through the creation of a "profile." Generation of a profile is a difficult and often imprecise task involving the manual input of a large amount of technically detailed information, including information that is not necessarily relevant to the targeted discovery operation. Thus, it would be beneficial to provide a mechanism to facilitate the capture and processing of discovery profile information.

SUMMARY

The invention describes a method and graphical user interface that simplifies a user's task of specifying what types of components (hardware and/or software), domains and methods are to be used during a network or, more generally, an IT infrastructure discovery operation. A method in accordance with one embodiment of the invention includes selecting (through a first graphical interface element) one or more types of computer network components to discover, selecting (through a second graphical interface element) one or more network domains to search for the selected component types, selecting (through a third graphical interface element) one or more discovery methods for each type of computer network component selected through the first graphical interface element and storing indications of the user selected computer network components, network domains and discovery methods. The collection of stored indications comprising a discovery set specification.

In another embodiment, a predefined discovery set specification may be used to initialize or pre-select various options presented to the user through the graphical user interface. In yet another embodiment, user interface elements are presented that permit the user to specify a schedule on which the defined discovery action is to be performed. In still another embodiment, user interface elements are presented that permit the user to specify post-discovery actions. One illustrative post-discovery action is to notify the user (for example, by email) that the specified discovery action has been completed.

Methods in accordance with the invention may be stored in any media that is readable and executable by a computer system.

BRIEF DESCRIPTION OF THE DRAWINGS

FIGS. 3A and 3B show illustrative introductory screen display structures in accordance with one embodiment of the invention.

FIGS. 4A and 4B show illustrative discovery type selection screen display structures in accordance with one embodiment of the invention.

FIGS. 5A-5E show illustrative domain selection screen display structures in accordance with one embodiment of the invention.

FIG. 6A-6E show illustrative method selection screen display structures in accordance with one embodiment of the invention.

FIG. 8 shows an illustrative scheduling screen display structure in accordance with one embodiment of the invention.

DETAILED DESCRIPTION

New and useful methods, apparatus, systems and computer program products to capture infrastructure topology discovery task information are described. The following descriptions are presented to enable any person skilled in the art to make and use the invention as claimed and are provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

In one embodiment of the invention a software application (e.g., a "wizard") is used to graphically present a series of options to a user by which the user may select or specify certain discovery task parameters. Based on the user's input, other discovery operation parameters may be automatically determined. The collection of user-specified and automatically determined parameters, referred to herein as a "Discovery Set," specifies a unique discovery operation. Discovery sets are the means by which a user specifies what type of components she wants to discover, how the components should be discovered and when the components should be discovered. As used herein, the term "component" means any hardware device (e.g., a computer system, storage device or switch) or software application (e.g., a database application, enterprise resource planning system or operating system) that may be detected by a network discovery action.

Figure 1:
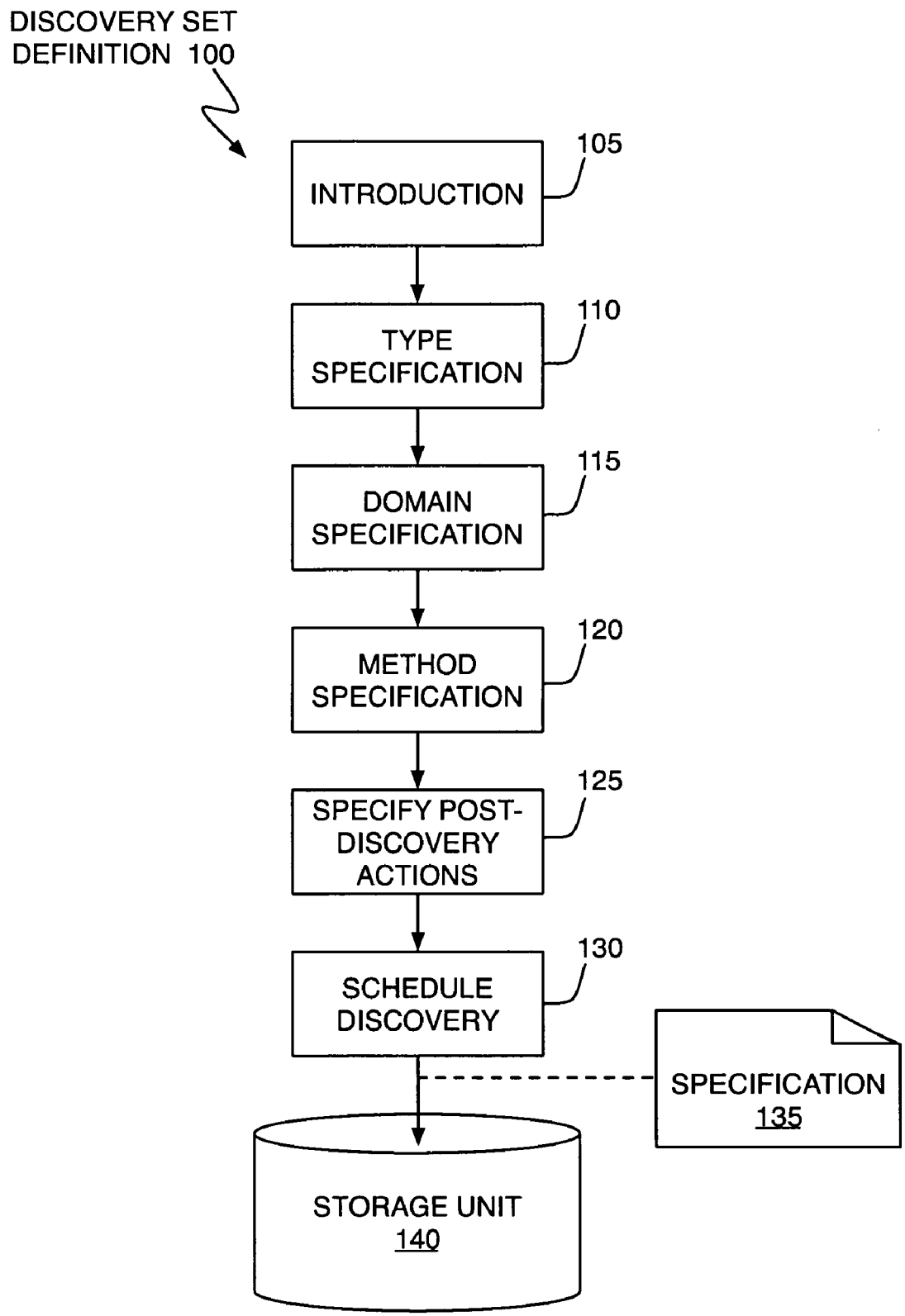
FIG. 1 shows, in block diagram format, a discovery set specification method in accordance with one embodiment of the invention.

Referring to FIG. 1, in accordance with one embodiment of the invention discovery set definition method 100 includes introductory operations (block 105) in which the user is informed of the scope of the discovery set definition task; type specification operations (block 110) during which the user specifies what type of components should be discovered (e.g., SAP® systems, enterprise applications based on Java® platforms such as the Java 2 platform enterprise edition or "J2EE®" and/or computer systems executing the Unix® operating system); domain specification operations (block 115) in which the user identifies a set of addresses over which the discovery operation is to be performed; and method specification operations (block 120) in which the user specifies one or more discovery methods for each type of component specified during the acts of block 110. (SAP is a registered trademark of SAP Aktiengesellschaft, a joint stock company of the Federal Republic of Germany. JAVA and J2EE are registered trademarks of Sun Microsystems, Inc. of Santa Clara, Calif. UNIX is a registered trademark of the American Telephone and Telegraph Company Corporation of New York, N.Y.) Optional post-discovery actions may also be specified (block 125). For example, whether a graphical representation of the discovered components should be displayed. In addition, optional scheduling information may be input (block 130). For example, to cause a discovery action defined by the discovery set to be executed at a specified time and/or at a specified interval. Once the acts of block 130 are completed, discovery set specification 135 may be retained in storage unit 140 in any format accessible to a discovery engine (e.g., an application). One of ordinary skill in the art will recognize that discovery set specification 135 may represent, for example, one or more files or one or more database entries or objects. Similarly, storage unit 140 may represent, for example, one or more direct access storage devices (e.g., magnetic or optical disk storage devices), one or more database tables or one or more database objects.

Figure 2:
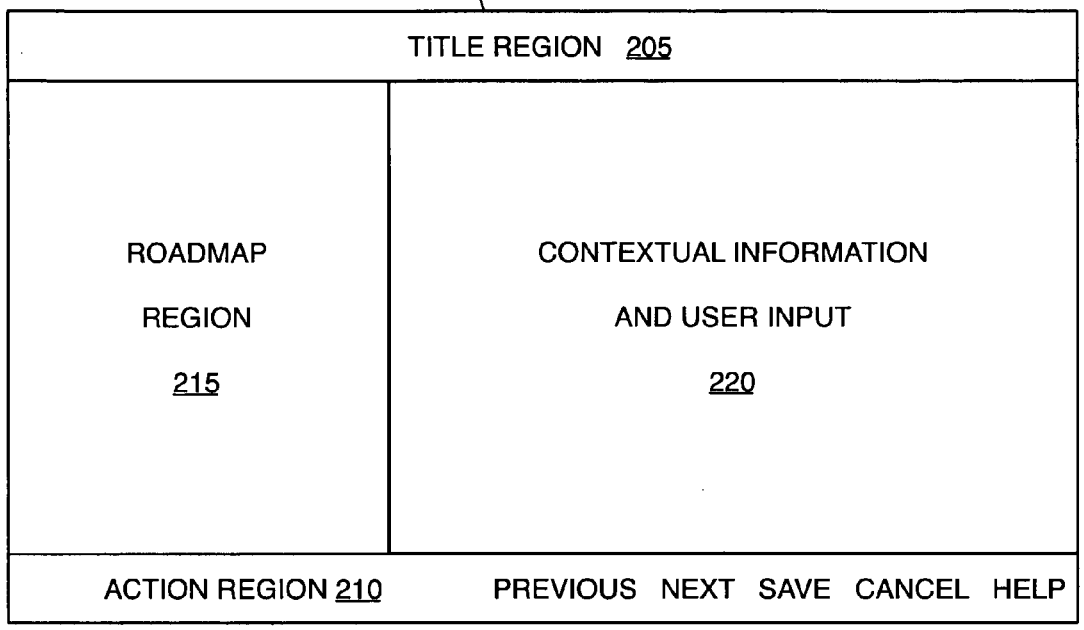
FIG. 2 shows the structure or layout of a user interface window in accordance with one embodiment of the invention.

In one embodiment, user input for each discovery set definition operation (e.g., 105-130) is solicited through a uniform graphical user interface. Referring to FIG. 2, in one embodiment the uniform graphical interface comprises user interface window 200 having title region 205, action region 210, roadmap region 215 and contextual information and input region 220. Title region 205 is generally used to identify which step of discovery definition process 100 is currently active. Action region 210 provides "Previous," "Next," "Save," "Cancel," and "Help" buttons which the user may select at any time to navigate through or terminate the current discovery set definition. (It will be recognized that certain action buttons may not be enabled at all times. For example, if the displayed window is the first (last) in a sequence of windows, the "Previous" ("Next," button will not be enabled.) Roadmap region 215 is generally used to present "big picture" information with respect to the current operation. As such, the contents of roadmap region 215 are dynamic. Contextual region 220 is generally used to present user input options that are unique to the current definition operation. Accordingly, the contents of contextual region 220 are also dynamic.

Referring to FIG. 3A, in one embodiment invocation of discovery set definition process 100 causes introductory window 300 to be generated (introductory operations 105). As shown, title region 305 indicates the current window is associated with introductory operations. In addition, roadmap region 310 indicates not only that the current window is associated with introductory operations (via an illustrative check-box), but that additional steps remain to be completed (e.g., type, domain, method, post-discovery actions and schedule specification operations). Contextual information region 315 may prompt the user to specify a name for a new discovery set and/or offer the opportunity to select a previously defined discovery set (i.e., to perform a "rediscovery" operation). Referring to FIG. 3B, in one embodiment contextual information region 315 may itself comprise input regions 320 and 325. Region 320 may be used by the user to enter the name of a new discovery set, while region 325 may be used to display a list of previously defined discovery sets wherein the user may select one of them. After the user supplies a discovery set name in region 320 or selects a previously defined discovery set displayed in region 325 the user may select the "Next" button in action region 210 (see FIG. 2) or, alternatively, an input trigger button (such as, for example, an "OK" button) may be provided in either or both of regions 320 and 325.

Referring to FIG. 4A, in one embodiment following introductory operations 105 type specification window 400 is generated (type specification operations 110). As shown, title region 405 indicates the current window is associated with type specification operations. In addition, roadmap region 410 indicates not only that the current window is associated with type specification operations, but that introductory operations have been completed (via shading, for example) and that additional steps remain to be completed (e.g., domain, method, post-discovery actions and schedule specification operations). Central to discovery operations is the identification of what types of components to discovery. Illustrative component types include, but are not limited to, SAP systems, J2EE systems, Oracle® systems, DB2® systems, Simple Network Management Protocol ("SNMP") devices and computer systems executing the Windows® operating system through, for example use of Windows Management Instrumentation ("WMI") technology. (ORACLE is a registered trademark of Oracle International Corporation of Redwood City, Calif. DB2 is a registered trademark of International Business Machines Corporation of Armonk, N.Y. WINDOWS is a registered trademark of Microsoft Corporation of Redmond, Wash.) Referring to FIG. 4B, in one embodiment contextual information region 415 may itself comprise a list region 420 and description region 425. Region 420 may display a list of one or more types of components to discover through, for example, a check lists/boxes, bullets or other means. Region 425 may be used to display a brief description of the component type(s) selected in region 420.

After the user selects at least one component type displayed in region 420 the user may select the "Next" button in action region 210 (see FIG. 2) or, alternatively, an input trigger button (such as, for example, an "OK" button) may be provided in either or both of regions 420 and 425.

It is noted that if the user had selected a previously defined discovery set during the acts of block 105 (see FIGS. 4A and 4B), contextual type specification fields in region 415 will be populated to reflect the selections made in the earlier definition. At this point, the user may simply accept the prior definitions by selecting the "Next" button in action region 210 or they may alter the selection by selecting additional types and/or un-selecting one or more types previously selected.

Referring to FIG. 5A, in one embodiment the start of domain selection operations 115 causes window 500 to be generated. As shown, title region 505 indicates the current window is associated with domain specification operations. In addition, roadmap region 510 indicates not only that the current window is associated with domain specification operations, but that introductory and type specification operations have been completed (via shading, for example) and that additional steps remain to be completed (e.g., method, post-discovery actions and schedule specification operations). Similar to previous windows, contextual information and user input region 515 provides the means by which a user may specify one or more domains over which a discovery action is to occur.

Referring to FIG. 5B, in one embodiment contextual information and user input region 515 comprises a series of tabs 520—each one associated with a different mechanism that may be used by a user to specify a domain. For example, if the DOMAIN tab is selected the user may select from one or more previously defined domains (e.g., www.bmc.com or obonal-eu). Previously defined domains may be stored independently from, or integral to, discovery sets in a discovery database or otherwise. If such a mechanism is provided, a list of available domains is presented in region 522. The user may select a domain listed in region 522 and include it in the current discovery set (thereafter displayed in region 524) by activating button 526. Information related to the one or more selected domains may be displayed for the user's convenience in region 528.

Figures 5C, 5D:

Referring to FIG. 5C, if the SUBNET tab is selected the user may select from one or more previously defined subnets (e.g., 192.168.54.*). Previously defined subnets may be stored independently from, or integral to, discovery sets in a discovery database or otherwise. If such a mechanism is provided, a list of available subnets is presented in region 530. The user may select a domain listed in region 530 and include it in the current discovery set (thereafter displayed in region 532) by activating button 534. Provision for entry of a subnet mask may also be provided (not shown in FIG. 5C). Information related to the one or more selected subnets may be displayed for the user's convenience in region 536.

Referring to FIG. 5D, if the HOST tab is selected the user may specify a new domain name 538 or select a domain through buttons 540. For example, a specific network IP address (e.g., 192.168.1.1) could be input or a specific host could be named (e.g., ExampleHost) or a host could be selected from a list of known hosts (e.g., those obtained from a local DNS server or recorded in a discovery database). It will be recognized that such information may be recorded in an associated discovery database or in another, different database or file. Once a host has been specified, it may be added by selected A4 button 542. After being added to the discovery set's list of selected domains, it will appear in region 544. Similarly, if a host is selected from within region 544 (e.g., by a mouse click), it may be deleted from the current discovery set's definition via REMOVE button 542.

Figure 5E:
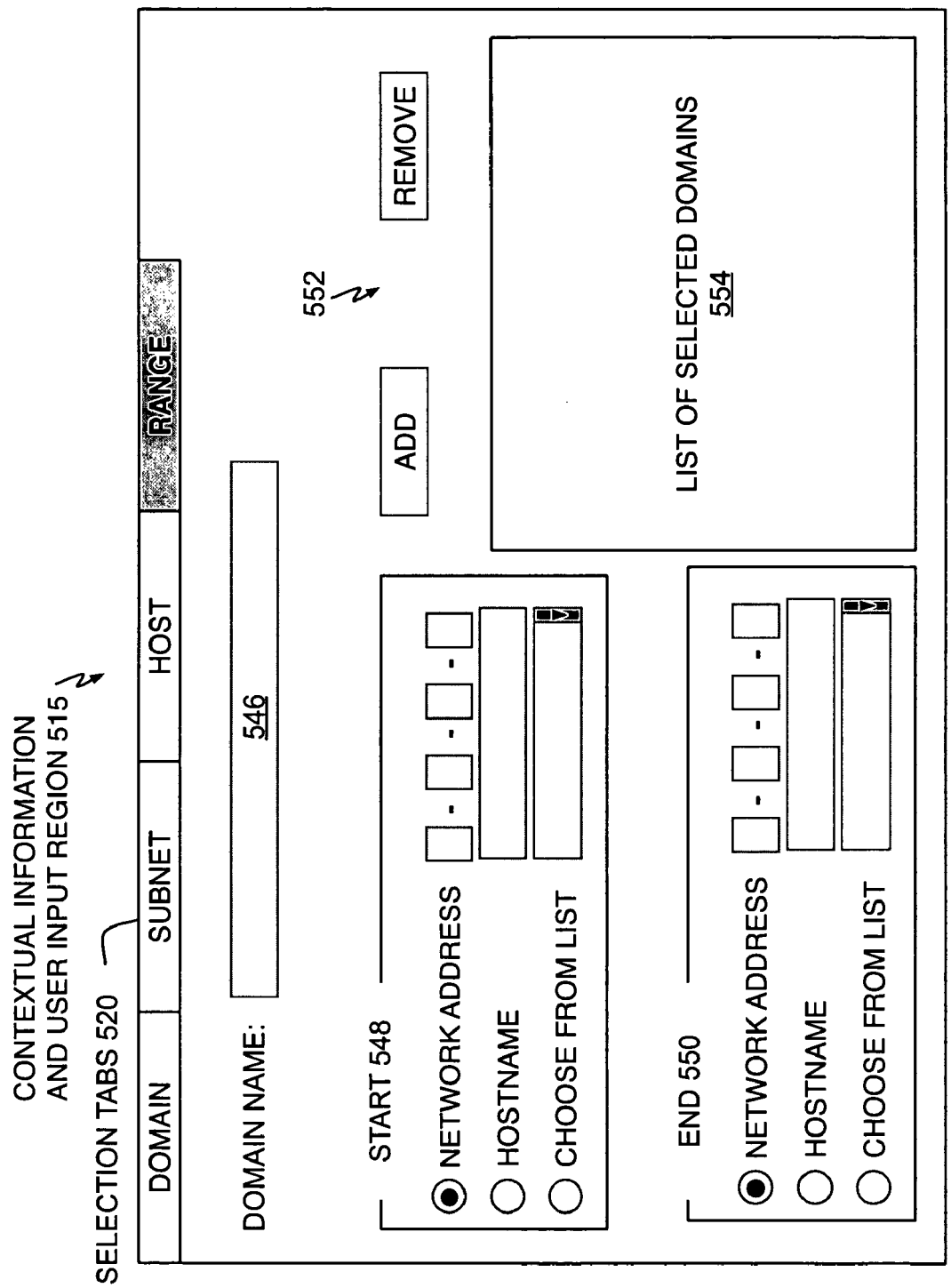

Referring to FIG. 5E, if the RANGE tab is selected the user may specify a new domain name 546 similar to that of entry 538 in FIG. 5D. A range of network addresses may be entered through the use of START 548 and END 550 elements, each of which operates as described with respect to element 540 in FIG. 5D. In a like manner, A4 and REMOVE buttons 552 and region 554 behave as elements 542 and 544 in FIG. 5D.

Once the user has specified a domain using one or more of the techniques described above with respect to FIGS. 5B-5E, the user accepts the identified domain list by selecting the "Next" button in action region 210 (see FIG. 2) or, alternatively, by selecting an input trigger button (such as, for example, an "OK" button) such as may be provided in region 515.

Referring now to FIG. 6A, in one embodiment the start of method selection operations 120 causes window 600 to be generated. As shown, title region 605 indicates the current window is associated with discovery method specification operations. In addition, roadmap region 610 indicates not only that the current window is associated with method specification operations, but that introductory, type and domain specification operations have been completed (via shading, for example) and that additional steps remain to be completed (e.g., post-discovery actions and schedule specification operations). Similar to previous windows, contextual information and user input region 615 provides the means by which a user may specify one or more domains over which a discovery action is to occur.

Referring to FIG. 6B, in one embodiment contextual information region 615 may itself comprise three panels or regions: selected discovery type panel 620, relevant discovery method panel 622 and information panel 624. In this embodiment, panel 620 lists all of those types selected by the user during the acts of block 110. This list could be organized in any manner, for example, alphabetically. In addition, one of the listed discovery types (e.g., the top-most entry of the list) may be selected by default. Panel 622 identifies the relevant discovery methods for the type entry selected in region 620. By way of example, WMI, secure shell ("SSH") and Telnet methods may be listed in panel 622 if an Asset type component is selected in panel 620. Alternatively, if a J2EE type component was selected in panel 620, Java management extensions ("JMX") methods could be listed in methods panel 622. For each discovery type, one or more methods may be selected (e.g., via a "check-box" interface mechanism). Information panel 624 may be used to display helpful support information to the user for each of the selected discovery methods. For example, information panel 624 may display, for each selected discovery method, a brief description of the method (e.g., what kind of information it returns), a list of the parameters and credentials that the method requires (e.g., user name and password) and any other information the user may find helpful (e.g., indication that the selected method will use the user's root password or that the method generates a relatively high network load). the user may review this information, using it to form their final decision as to whether you actually want to use the method. For example, if method-N is one of 3 methods selected to discover a particular type of component, and information panel 624 indicates this method generates a substantial network load or requires a credential not available to the user, they may choose not to use the selected method. Referring to FIG. 6C, in another embodiment method window 600 may display type panel 620 in place of roadmap region 215 and divide contextual information and user input region 615 so as to display the list of relevant discovery methods 622 and information panel 624.

To reduce the user's burden, it is preferable that only those types of components selected during type specification operations (block 110) are presented in panel 620. For the same reasons, it is preferable that only those methods relevant to the selected component type are listed in panel 622. It has been found that this selective culling of information assists the user focus on only those issues relevant to their goal—eliminating the need to consider discovery types and/or methods that are not pertinent to the component they are currently considering.

Once the user has specified at least one discovery method for each selected type entry, she may continue discovery set definition process 100 by selecting the "Next" button in action region 210 (see FIG. 2) or, alternatively, by selecting an input trigger button (such as, for example, an "OK" button) such as may be provided in region 615.

Part of the information available to discovery set definition process 100 is the identity of each discovery method's parameters and the credentials needed to perform the method. Referring to FIG. 6D, in one embodiment users specify values for each parameter associated with a selected discovery method through parameter window 626. For example, the SNMP method requires that Version and Port parameter values be specified. As shown, region 610 includes a list of all the parameters associated with the method identified in title region 628. (In FIG. 6D, the "XXXXX" string in title region 628 represents the name of a specific discovery method.) Selecting a parameter listed in region 610 causes contextual information and user input region 615 to display the list of parameters associated with the method and a means by which the user may input values for each. It will be recognized that some parameters may require a value (mandatory parameters) and some may not (optional parameters). All or some of both mandatory and optional parameters may be assigned default values and, if so assigned, will be displayed in user input region 615. Once the user has specified, or accepted default values, for at least a method's mandatory parameters, another discovery method may be similarly addressed by selecting the "Next" button in action region 210 (see FIG. 2) or, alternatively, by selecting an input trigger button (such as, for example, an "OK" button) such as may be provided in region 615. The user may utilize the "Previous" button in action region 210 to revisit a previously addressed discovery method.

Referring to FIG. 6E, in one embodiment users specify credential values for those discovery methods that require them through credential window 630. For example, the SNMP method requires a "community name" credential and the WMI discovery method requires a user name and password. As shown, region 610 includes a list of all the credentials associated with the discovery method identified in title region 632. (In FIG. 6E, the "XXXXX" string in title region 632 represents the name of a specific discovery method.) Selecting a credential listed in region 610 causes contextual information and user input region 615 to display the name of the credential and a means through which the user can enter a value(s). A user may input one or more values (e.g., one or more community names or user name/password combinations) for each credential. In addition, for those credentials that rely on passwords or other "private" information, user input via region 615 may be encrypted. Once the user has specified a method's credentials, another discovery method may be similarly addressed by selecting the "Next" button in action region 210 (see FIG. 2) or, alternatively, by selecting an input trigger button (such as, for example, an "OK" button) such as may be provided in region 615. As previously noted, the user may utilize the "Previous" button in action region 210 to revisit a previously addressed discovery method.

Following specification of the methods to use during the discovery action, the user may specify zero or more optional actions to take following completion of the discovery action. For example, the user may choose to receive an email notification that the discovery action has completed or was not completed and any error messages describing the reasons the discovery was not completed. The user may also specify that one or more actions occur when she reconnects to the discovery application. Illustrative reconnect actions include, but are not limited to, prompt to review the log files associated with the discovery action and entry into a validation phase for discovered components (if needed). In addition, post-discovery actions may be tied to specific details of the defined discovery set. For example, if the discovery set definition includes a SAP discovery type, the user may specify that at the end of the discovery action, a SAP map is opened and fed with the result of a well-known SAP query.

Figure 7:
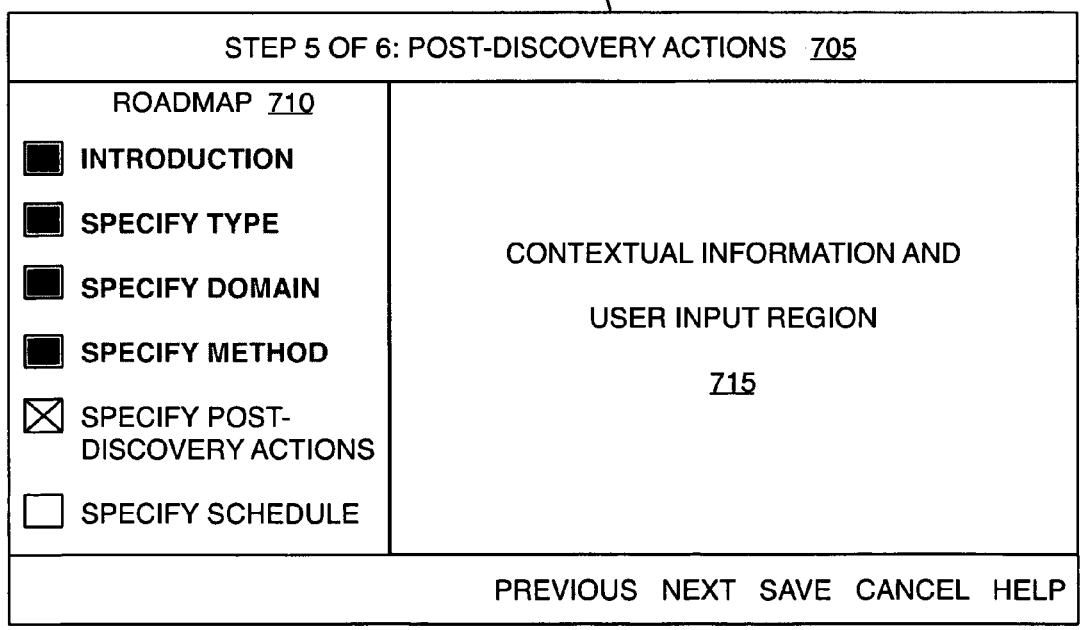
FIG. 7 shows an illustrative post-discovery action selection screen display structure in accordance with one embodiment of the invention.

Referring to FIG. 7, in one embodiment the start of post-discovery action specification operations 125 causes window 700 to be generated. As shown, title region 705 indicates the current window is associated with the specification of post-discovery actions. In addition, roadmap region 710 indicates not only that the current window is associated with post-discovery operations, but that introductory, type, domain and method specification operations have been completed (via shading, for example) and that only schedule specification operations remain. Similar to previous windows, contextual information and user input region 715 provides the means by which a user may specify one or more post-discovery actions. One of ordinary skill in the art will recognize that the layout of region 715 depends upon the available actions. As this entire step is optional, the user is not required to specify any action. In one embodiment, the optional nature of this operation may be noted by some visual effect or wording in window 700 (e.g., the word "OPTIONAL" may be included in title region 705, roadmap region 710 or contextual information and user input region 715). Once the user has specified any desired post-discovery actions (including none), she may move to the next phase or step of defining the discovery set by selecting the "Next" button in action region 210 (see FIG. 2) or, alternatively, by selecting an input trigger button (such as, for example, an "OK" button) such as may be provided in region 715.

Following the specification of any desired post-discovery actions, the user may specify a schedule for the defined discovery action. Referring to FIG. 8, in one embodiment the start of optional scheduling operations 130 causes window 800 to be generated. As shown, title region 805 indicates the current window is associated with the scheduling the defined discovery action. In addition, roadmap region 810 indicates not only that the current window is associated with scheduling operations, but that no more operations remain to be performed (via shading, for example). Similar to previous windows, contextual information and user input region 815 provides the means by which a user may specify when the defined discovery set is to be performed. In general, a user may specify when and how often a discovery action is to be run. For example, every day at 2015 hours or the first Saturday of each month at 0600 hours. in one embodiment, if no recurrence time is specified it is assumed that the action will be once—at the specified time. In addition, a default time may be provided such as "immediately." Once the user has specified a schedule or accepted the default execution schedule, she may move to the next phase or step of defining the discovery set by selecting the "Next" button in action region 210 (see FIG. 2) or, alternatively, by selecting an input trigger button (such as, for example, an "OK" button) such as may be provided in region 715.

Figure 9:
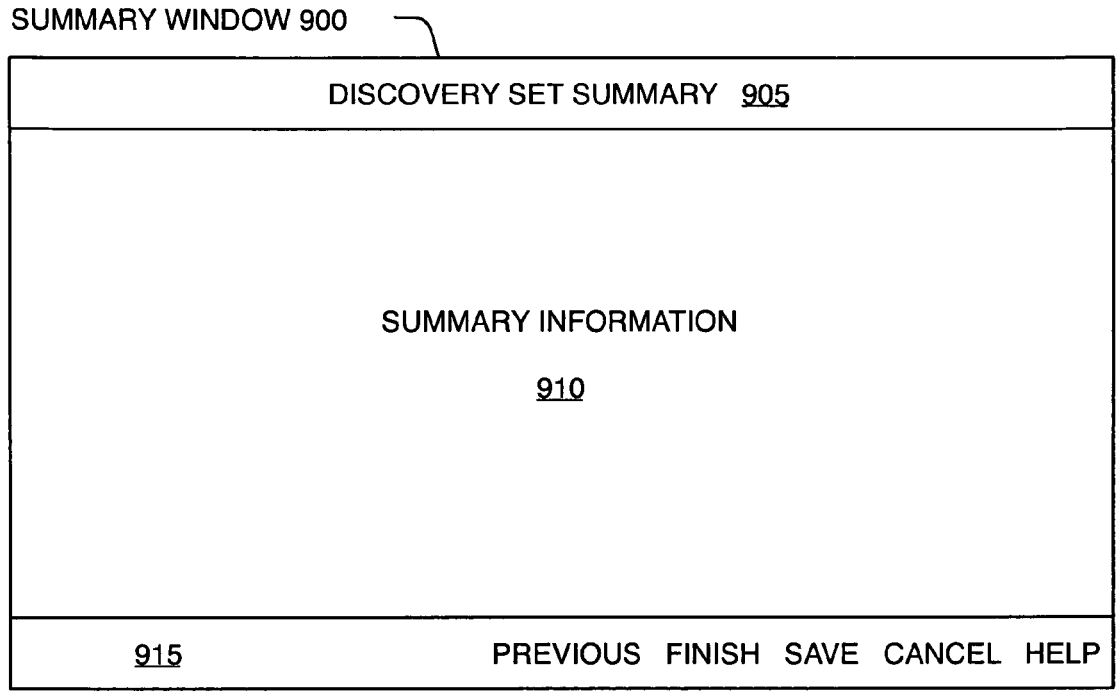
FIG. 9 shows an illustrative summary screen display structure in accordance with one embodiment of the invention.

With completion of scheduling operations 130, discovery set definition process 100 is completed. Referring to FIG. 9, however, in one embodiment summary window 900 is presented just prior to saving the defined discovery set to storage unit 140 (see FIG. 1). As shown, title region 905 indicates the current window is a summary window. Summary information region 910 presents a listing of all the choices made by the user during the acts of blocks 105-130. In addition, region 910 may also include a "consequences" section in which the discovery set's expected run-time, resource usage and impact to other users may be briefly described. If the user is satisfied with their prior selections, she may activate the "Finish" button in action region 915. In response, discovery set specification 135 is stored in storage unit 140. As previously noted, discovery set specification 135 may represent one or more files or one or more entries in a database. Similarly, storage unit 140 may represent one or more direct access storage devices (e.g., magnetic or optical disk storage devices), one or more database tables or one or more database objects.

Figure 10:
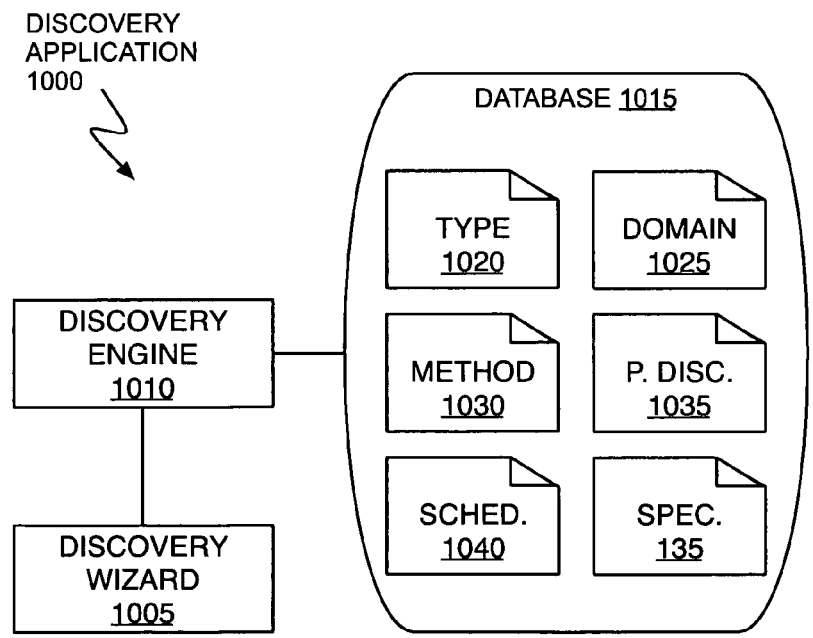
FIG. 10 shows a discovery application in accordance with one embodiment of the invention.

Referring now to FIG. 10, a graphical user interface in accordance with the invention may be incorporated in discovery application 1000. In particular, discovery wizard 1005 (the software module responsible for generating views in accordance with FIGS. 3-9) may be invoked by or through discovery engine 1010 (the software module responsible for performing or orchestrating actual discovery operations). As shown, discovery engine 1010 uses database 1015 to retain information related to discover types 1020, domains 1025, methods 1030, post-discovery actions 1035, scheduling 1040 and discovery specifications 135 generated in accordance with FIG. 1. It will be recognized that database 1015 may comprise more than one physical store and more than one database—closely coupled or distributed across a network.

Figure 11:
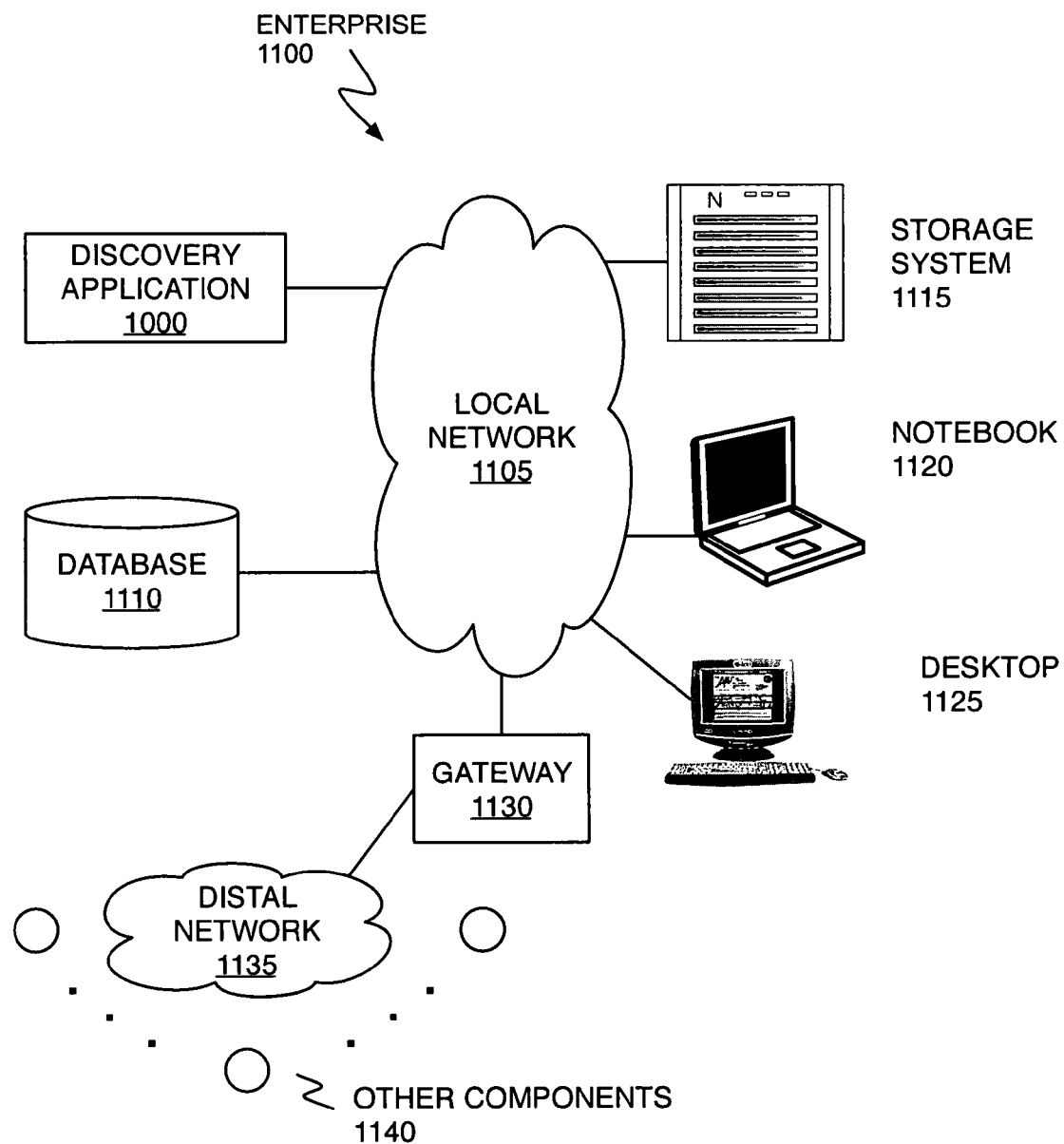
FIG. 11 shows a computer enterprise in accordance with one embodiment of the invention.

Referring to FIG. 11, discovery application 1000 in accordance with the invention may be part of enterprise 1100. As shown, discovery application 1000 is coupled to local network 1105 and, via this network, various components such as database system 1110, storage system 1115, notebook computer 1120 and desktop computer 1125. In addition, discovery application 1000 may be communicatively coupled, via gateway 1130, to distal network 1135 having other components 1140.

One benefit of a discovery set definition process in accordance with the invention is that the user is relieved of the burden of determining what aspects of the discovery action need be defined. Another benefit of the inventive process is that a user may be presented with queries (or asked for input) for only those elements necessary to the discovery. For example, if the only type of component identified for discovery during the acts of block 110 (see FIG. 1) are J2EE systems, only those discovery methods related to J2EE systems will be proffered to the user during the acts of block 120. Further, any post-discovery actions not appropriate for J2EE discovery can also be withheld from the user's view during the acts of block 125. Yet another benefit of the invention is that discovery set definition operations may be suspended at any time by the user. This may, for example, be accomplished by activating the "Cancel" button in any window's action bar (see element 210 in FIG. 2). In one embodiment, activating the "Cancel" button causes the user to be prompted to either save or abandon the discovery set. Partially completed discovery sets may be stored in a database or file specific to the discovery application, in a location specified by the user or in a database/file that is available to other applications.

It is further noted that a user interface in accordance with the invention is modular. That is, as new types of components become known (see block 105 in FIG. 1) or additional methods are developed for existing components (see block 110 in FIG. 1), they may be easily incorporated into the display and selection technique described herein. By way of example only, discovery set definition technique 100 may use an Application Programming Interface ("API") to obtain known types of components and discovery methods from a database (specialized to the discovery operation or generally accessible).

Various changes in the components, display structures and details of the illustrated operational methods are possible without departing from the scope of the following claims. For instance, the operations shown in FIG. 1 need not be performed in the sequence illustrated. In addition, a discovery wizard in accordance with the invention and as embodied in FIG. 1 or display the structures of FIGS. 3-9, need not be part of or integral to discovery application 1000 of FIG. 10. That is, a graphical user interface in accordance with the invention may be embodied as a stand-alone executable that interacts (through, for example, an API) with discovery engine 1010 and/or database 1015. Further, domain specification operations (block 115 of FIG. 1) may rely in whole, or in part, on an external application. That is, a "domain editor" application or module may be used to define a domain whereafter it may be selected through use of an interface in accordance with the invention.

It will be recognized that acts in accordance with FIG. 1 may be performed by a programmable control device executing instructions organized into one or more program modules. A programmable control device may be a single computer processor, a special purpose processor, a plurality of processors coupled by a communications link or a custom designed state machine. Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A computer network discovery specification method, comprising:
   selecting, through a first graphical interface element, one or more types of computer network components;
   selecting, through a second graphical interface element, one or more network domains;
   selecting, through a third graphical interface element, one or more discovery methods for each type of computer network component selected through the first graphical interface element, wherein the act of selecting one or more discovery methods comprises selecting a discovery method from a list of discovery methods presented in the third graphical interface element, wherein the list of preexisting discovery methods comprise only discovery methods relevant to a selected type of computer network component; and
   storing indications of the user selected computer network components, network domains and discovery methods.

2. The method of claim 1, further comprising specifying, though a fourth graphical interface element, zero or more post-discovery actions.

3. The method of claim 2, further comprising specifying, through a fifth graphical interface element, a schedule to execute a discovery operation based on the user selected computer network components, network domains and discovery methods.

4. The method of claim 2, wherein the act of specifying post-discovery actions comprises specifying a notification be sent to the user on completion of a discovery action based on the user selected computer network components, network domains and discovery methods.

5. The method of claim 4, wherein the notification comprises and email notification.

6. The method of claim 3, wherein the act of specifying a schedule comprises specifying a start time.

7. The method of claim 6, wherein the act of specifying a schedule further comprises specifying a reoccurrence interval.

8. The method of claim 1, further comprising presenting a fourth graphical interface element through which the user specifies a schedule to execute a discovery operation based on the user selected computer network components, network domains and discovery methods.

9. The method of claim 8, wherein the act of specifying a schedule comprises specifying a start time and a reoccurrence interval.

10. The method of claim 1, wherein the act of selecting one or more types of computer network components comprises selecting at least one hardware component or at least one software component.

11. The method of claim 1, wherein the act of selecting one or more network domains comprises selecting a domain from a list of preexisting domains presenting in the second graphical interface element.

12. The method of claim 1, wherein the act of selecting one or more network domains comprises specifying a first and second Internet Protocol addresses through the second graphical interface element.

13. The method of claim 12, wherein the act of specifying a first Internet Protocol addresses comprises specifying a host computer name.

14. The method of claim 12, wherein the act of specifying a second Internet Protocol addresses comprises specifying a host computer name.

15. The method of claim 1, wherein the act of storing comprises storing indications of the user selected computer network components, network domains and discovery methods in a database.

16. The method of claim 3, wherein the act of storing comprises storing indications of the user selected computer network components, network domains, discovery methods, post-discovery actions and schedule in a database.

17. The method of claim 1, further comprising selecting, through a fourth graphical interface element, one or more predefined computer network discovery specifications.

18. The method of claim 17, further comprising pre-selecting one or more types of computer network components in the first graphical interface element based on the selected computer network discovery specification in the fourth graphical interface element.

19. The method of claim 17, further comprising pre-selecting one or more network domains in the second graphical interface element based on the selected computer network discovery specification in the fourth graphical interface element.

20. The method of claim 1, further comprising presenting, through a fourth graphical interface element, a summary of the selected types of computer network components, network domains and discovery methods.

21. A program storage device, readable by a programmable control device, comprising instructions for causing the programmable control device to:
generate a first graphical interface element configured to permit a user to select one or more types of computer network components;
generate a second graphical interface element configured to permit a user to select one or more network domains;
generate a third graphical interface element configured to permit a user to select one or more discovery methods for each type of computer network component selected through the first graphical interface element; and
store indications of the user selected computer network components, network domains and discovery methods;
wherein the instructions to generate a third graphical interface element comprise instructions to generate a list of discovery methods comprising only discovery methods relevant to a selected type of computer network component.

22. The program storage device of claim 21, further comprising instructions to generate a fourth graphical interface element to display a list of one or more predefined computer network discovery specifications.

23. The program storage device of claim 22, further comprising instructions to pre-select one or more types of computer network elements in the first graphical interface element based on a predefined computer network discovery specification displayed in the fourth graphical interface element.

24. The program storage device of claim 22, further comprising instructions to pre-select one or more network domains in the second graphical interface element based on a predefined computer network discovery specification displayed in the fourth graphical interface element.

25. A computer enterprise, comprising:
a plurality of components communicatively coupled to a network, wherein at least one of the components includes memory; and
a discovery application executing on a first computer system communicatively coupled to the network, the discovery application having instructions for causing the first computer system to—
generate a first graphical interface element configured to permit a user to select one or more types of computer network components,
generate a second graphical interface element configured to permit a user to select one or more network domains,
generate a third graphical interface element configured to permit a user to select one or more discovery methods for each type of computer network component selected through the first graphical interface element, and
store indications of user selected computer network components, network domains and discovery methods;
wherein the instructions to generate a third graphical interface element comprise instructions to generate a list of discovery methods comprising only discovery methods relevant to a selected type of computer network component.

26. The computer enterprise of claim 25, wherein the discovery application further comprises instructions to generate a fourth graphical interface element to display a list of one or more predefined computer network discovery specifications.

27. The computer enterprise of claim 26, wherein the discovery application further comprises instructions to pre-select one or more types of computer network elements in the first graphical interface element based on a predefined computer network discovery specification displayed in the fourth graphical interface element.

28. The computer enterprise of claim 26, wherein the discovery application further comprises instructions to pre-select one or more network domains in the second graphical interface element based on a predefined computer network discovery specification displayed in the fourth graphical interface element.

29. The computer system of claim 25, wherein the instructions to store comprise instructions to store user selected computer network components, network domains and discovery methods in a database located on a second computer system communicatively coupled to the network.

\* \* \* \* \*

UNITED STATES PATENT AND TRADEMARK OFFICE
CERTIFICATE OF CORRECTION

| | | |
|---|---|---|
| PATENT NO. | : 7,941,506 B2 | Page 1 of 1 |
| APPLICATION NO. | : 11/295364 | |
| DATED | : May 10, 2011 | |
| INVENTOR(S) | : Olivier Bonal et al. | |

It is certified that error appears in the above-identified patent and that said Letters Patent is hereby corrected as shown below:

In column 13, line 7, in claim 29, delete "system" and insert -- enterprise --, therefor.

Signed and Sealed this
Second Day of August, 2011

David J. Kappos
*Director of the United States Patent and Trademark Office*